June 23, 1925.
E. G. HEDGES
SPREADER FOR URINAL STALLS
Filed Jan. 17, 1923
1,543,009
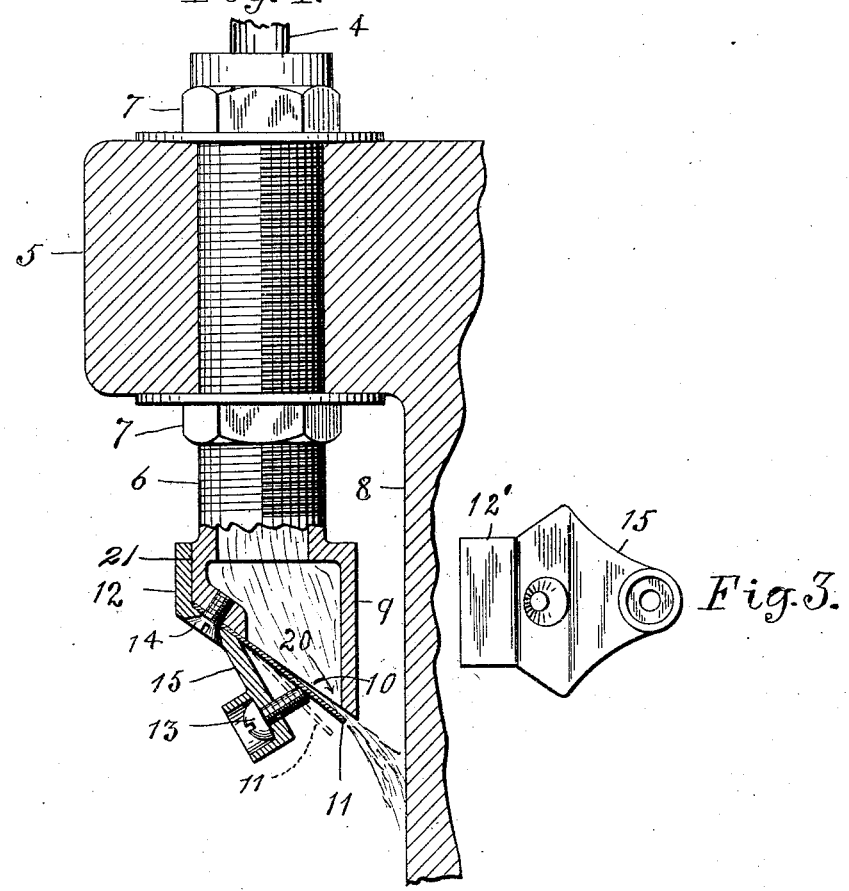
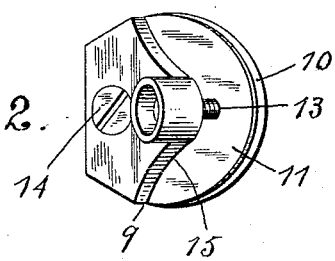
Inventor.
Edward G. Hedges, per
Thomas S. Crane, Atty.

Patented June 23, 1925.

1,543,009

UNITED STATES PATENT OFFICE.

EDWARD G. HEDGES, OF NEWARK, NEW JERSEY.

SPREADER FOR URINAL STALLS.

Application filed January 17, 1923. Serial No. 613,097.

*To all whom it may concern:*

Be it known that I, EDWARD G. HEDGES, a citizen of the United States, residing at Newark, county of Essex, and State of New Jersey, have invented certain new and useful Improvements in Spreaders for Urinal Stalls, fully described and represented in the following specification and the accompanying drawings, forming a part of the same.

The present invention relates to a spraying-nozzle which discharges water between the edge of a seat and a spring-leaf secured to one edge of the seat, and adjustable to and from the opposite edge of the seat to vary the discharge of the water.

The object of the invention is to regulate the flow of water from the nozzle in proportion to the pressure at which the water is delivered to the nozzle.

Such pressure varies in different aqueduct supplies and from time to time in the same supply, such difference being caused in part from the use of tanks to store water upon buildings too high to be supplied from the service-pipe.

The present invention furnishes a spraying-nozzle which delivers and spreads the water without splashing, and in which the discharge is directed toward the surface to be cleaned, and strikes the same at an angle suited to distribute and spread the water upon the wall of the stall in the most effective manner.

The invention will be understood by reference to the annexed drawing, in which Fig. 1 shows the shank of the sprayer mounted upon a lug at the top of a stall, and the head upon the lower end of the shank in section, to expose its construction; Fig. 2 is a view of the sprayer at its lower end; and Fig. 3 is a view of the outer side of the clamp and its bracket. A pipe 4 supplies the sprayer with water.

5 is the lug upon the stall, through which the shank 6 of the sprayer is extended and clamped by lock-nut 7.

The shank projects parallel with the wall 8 of the stall, and has the head 9 upon its lower end with a sloping seat 10 extended across the head.

A spring-leaf or spreader-member 11 is secured upon the upper end of the seat by a clamp 12 and clamp-screw 14, by which the edge of the spring-leaf is gripped to the head.

The spring-leaf is normally tempered so that its lower edge presses away from the seat 10, as shown in dotted lines in Fig. 1, thus forming a throat 20 for the discharge of the water; and it is adjusted to and from the seat by a screw 13 mounted in a bracket 15, which is extended from the clamping-screw 14.

By this construction the surface of the spring-leaf slopes downwardly toward the wall 8 and delivers the water against the wall at such an angle that the water is diffused or spread without being broken up and splashed.

The screw 13 presses constantly upon the spring-leaf, and is entirely accessible to a screwdriver, by which it may be instantly adjusted to and from its sloping seat and the wall 8. The throat or opening at the lower edge of the seat is thus readily varied to operate with the pressure supplied.

It will be observed in Fig. 2, that the head of the sprayer, like its shank 6, is of circular cross-section so that the sloping seat 10 has a circular margin, between which and the inner side of the spring-leaf the water passes to escape.

The principal discharge opening for the water is indicated at 20 opposite the lower end of the spring-leaf, and as the upper edge of the spring-leaf is rigidly clamped, the body of the leaf when its screw 13 permits, has an increased space from its upper to its lower end for the water to discharge. This produces a more abundant discharge at the lower end of the sprayer than at the sides, thus delivering the water upon the wall 8 in the most advantageous manner; but the relation of the leaf to the head may be the same with a rectangular cross-section and a rectangular leaf.

A flange 12′ as shown in Fig. 2 is of flat shape and engages a flattened portion 21 of the head 9, thus preventing said clamp 12 from turning when fastened upon the head. The flange 12′ is integral with the clamp.

This sprayer is a very simple construction embracing very few parts, as the head, the spring-leaf, a clamp for supplying one edge of the leaf to the seat, and an adjusting screw to vary the position of the leaf.

The relation of the leaf to the discharge opening of the head, and the means used to adjust the leaf, may obviously be applied to a nozzle mounted differently upon the shank, and having the four parts modified in construction to produce the same effect in discharging the water.

Having thus set forth the nature of the invention what is claimed herein is:

1. A spreader for urinal stalls comprising a head having a sloping valve seat extending across said head, a spring-leaf valve adapted to be moved toward said seat and tensioned to normally move away from said seat, a clamp secured to the upper edge of said valve seat, common means for securing said valve and said clamp to said head, means carried by said clamp other than said securing means and engaging said head to prevent said clamp from turning, and means carried by said clamp and engaging said spring leaf valve for adjusting the same toward said seat.

2. A spreader for urinal stalls comprising a tubular head, a tubular shank secured to the upper end of said head, the lower end of said head being shaped to provide a downwardly sloping valve seat, said lower end having a bridge member, a valve corresponding in outline to said valve seat, a flat clamp having a portion thereof engaging said valve adjacent said bridge member, means passing through said clamp and valve and engaging said bridge member to secure said clamp and valve to said head, said clamp having a flange engaging the outer side of said head to prevent turning movement of said clamp, and means carried by said clamp and engaging said valve to adjust the same toward said seat.

3. A spreader for urinal stalls comprising a tubular shank, a tubular head secured to one end of said shank, said head being of larger internal diameter than said shank, the lower end of said head sloping downwardly and forming a valve seat, the upper portion of said seat being enlarged to form a support, a valve having one edge secured to said support, a clamp, adjusting means carried by said clamp and engaging said valve to regulate the size of the discharge opening, and a single screw for securing said clamp and said valve to said support, said clamp having means engaging said head to prevent the clamp from turning.

In testimony whereof I have hereunto set my hand.

EDWARD G. HEDGES.